(12) United States Patent
Wang et al.

(10) Patent No.: US 7,280,434 B2
(45) Date of Patent: Oct. 9, 2007

(54) METHOD, MEDIUM, AND APPARATUS FOR GLOBAL LOCALIZATION

(75) Inventors: Dejun Wang, Beijing (CN); Jiali Zhao, Beijing (CN); Seokcheol Kee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 147 days.

(21) Appl. No.: 11/089,213

(22) Filed: Mar. 25, 2005

(65) Prior Publication Data
US 2005/0213431 A1     Sep. 29, 2005

(30) Foreign Application Priority Data
Mar. 26, 2004   (KR) ................. 10-2004-0020761

(51) Int. Cl.
*G01S 3/80* (2006.01)
(52) U.S. Cl. ..................... 367/118; 700/253
(58) Field of Classification Search ............... 367/118; 702/181; 700/245, 253; 318/567
See application file for complete search history.

(56) References Cited

U.S. PATENT DOCUMENTS

2005/0213431 A1* 9/2005 Wang et al. ............... 367/118

FOREIGN PATENT DOCUMENTS

| JP | 5-27832 | 2/1993 |
|---|---|---|
| JP | 11-249734 | 9/1999 |

OTHER PUBLICATIONS

Richter et al.; Mobile Robot Localization; Oct. 2003; www.robocup.tugraz.at/downloads/mobile_robot_localization.pdf; pp. 1-43.*
Office Action issued by the Korean Patent Office on Sep. 28, 2005.

* cited by examiner

*Primary Examiner*—Daniel T Pihulic
(74) *Attorney, Agent, or Firm*—Staas & Halsey LLP

(57) ABSTRACT

A global localization apparatus, medium, and method, with the global localization method including selecting one from a plurality of samples and shifting the selected sample according to a movement of a robot, generating a new sample within a predetermined range of the shifted sample, determining either the shifted sample or the new sample as a next sample at a next time step according to a predetermined condition for the shifted sample and the next sample, repeating for all the samples, and estimating a next position of the robot according to positions of the next samples when the number of next samples is equal to or larger than the maximum number of samples.

19 Claims, 10 Drawing Sheets

METHOD, MEDIUM, AND APPARATUS FOR GLOBAL LOCALIZATION

CROSS-REFERENCE TO RELATED APPLICATIONS

This application claims the benefit of Korean Patent Application No. 10-2004-0020761, filed on Mar. 26, 2004, in the Korean Intellectual Property Office, the disclosure of which are incorporated herein in its entirety by reference.

BACKGROUND OF THE INVENTION

1. Field of the Invention

Embodiments of the present invention relate to global localization methods, media, and apparatuses, and more particularly, to global localization methods, media, and apparatuses for a robot using a sequence of sonar operations.

2. Description of the Related Art

Global position estimation and local position tracking are two problems to be solved in a moving robot. Global position estimation determines the position of a robot using data collected by sensors and correlates the collected data with a priori map or a known map. If the priori map is not available, a timing map may be used, with the timing map including recorded time information of the robot moving about within a region. Once the position of the robot is determined on a map, a local position tracking problem is raised regarding a tracking of the robot along a trajectory to the determined position. Once a global location is known, the robot can navigate a complex environment reliably using the map.

In general, the position of a robot is estimated through a probabilistic approach such as a Kalman filter or Monte-Carlo Localization (MCL).

The MCL is a recursive Baysian filter that recursively estimates a belief distribution of the position of the robot, i.e., a posterior distribution thereof, using sensor data, with an assumed uniform initial belief distribution. However, the MCL is disadvantageous in that it is difficult to perform real-time position determination since the initial processing requires a large amount of computation of a large number of initial samples or particles. Also, when the size of a set of samples is small, it may be difficult to generate samples at a true pose. Accordingly, there are no samples at the true pose. Additionally, the samples may not be represented by a belief distribution for all positions in a plane where a robot can move.

SUMMARY OF THE INVENTION

Embodiments of the present invention provides a global position estimation method, medium, and apparatus using Monte-Carlo Localization (MCL), in which additional samples are generated by perturbing samples under predetermined conditions when the number of the samples at true pose is insufficient, thereby obtaining a belief distribution of samples.

According to one aspect of the present invention, there is provided a global localization method, including: selecting one from a plurality of samples and shifting the selected sample according to a movement of a robot; generating a new sample within a predetermined range of the shifted sample; determining either the shifted sample or the new sample as a next sample at a next time step according to a predetermined condition for the shifted sample and the next sample; repeating for all the samples; and estimating a next position of the robot according to positions of the next samples when the number of next samples is equal to or larger than the maximum number of samples.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more readily apparent by describing in detail exemplary embodiments thereof with reference to the attached drawings in which.

DETAILED DESCRIPTION OF THE PREFERRED EMBODIMENTS

Figure 1:
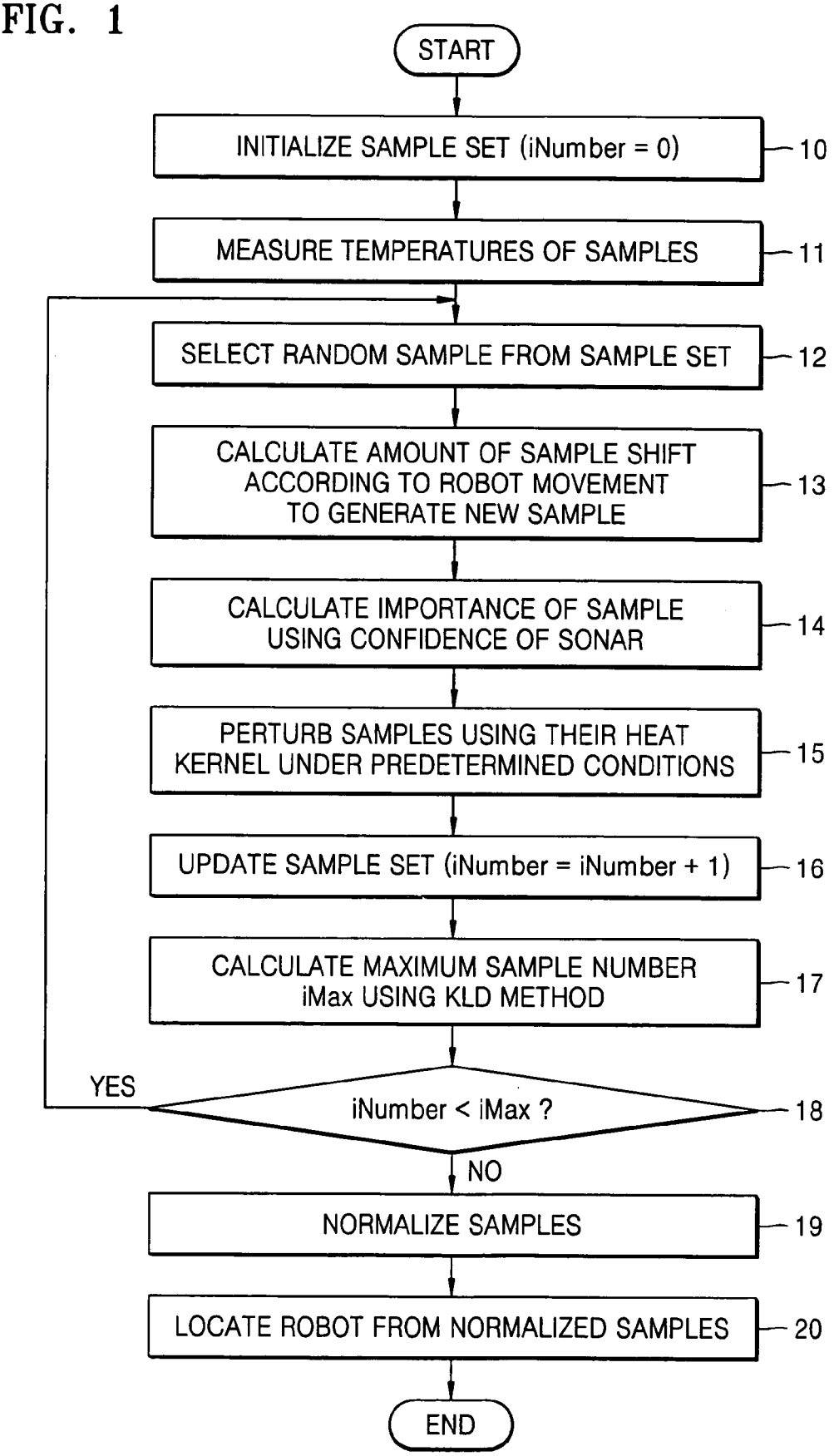
FIG. 1 is a flowchart illustrating a global localization method, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Embodiments of the present invention are based on the premise that samples are not likely to represent a true belief distribution when the numbers of samples are insufficient and, in actuality, may not be representative of their true positions. As compensation for insufficient samples, in an embodiment, the samples are perturbed within a predetermined range to represent a true belief distribution, e.g., some samples may be of less confidence or significance, while there may be greater confidence or significance for other samples, such that the relevance of samples of lesser confidence or significance may be discounted. The perturbation can be achieved through a Heat Kernel (HK) according to a temperature of each sample.

A robot is very likely to be located in a dense area of samples, and thus, it is assumed that the HK of the samples, i.e., a perturbation probability, is small. In a sparse area of samples, it is assumed that the HK of samples is large since the positions of the samples may be changed many times until the true positions are found. In other words, samples may be required to be moved from a lower important area to a highly important area. Accordingly, samples of higher importance will have a smaller perturbation probability, whereas samples of lower importance will have a higher perturbation probability.

The HK of a sample can be determined by an average density of the samples. An initial average density of the sample is low due to even distribution of the samples, such that the HK of intermediate samples is large. In any instant of time, the HK of a sample of higher importance is smaller than that of the HK of samples of lower importance.

Figure 2:
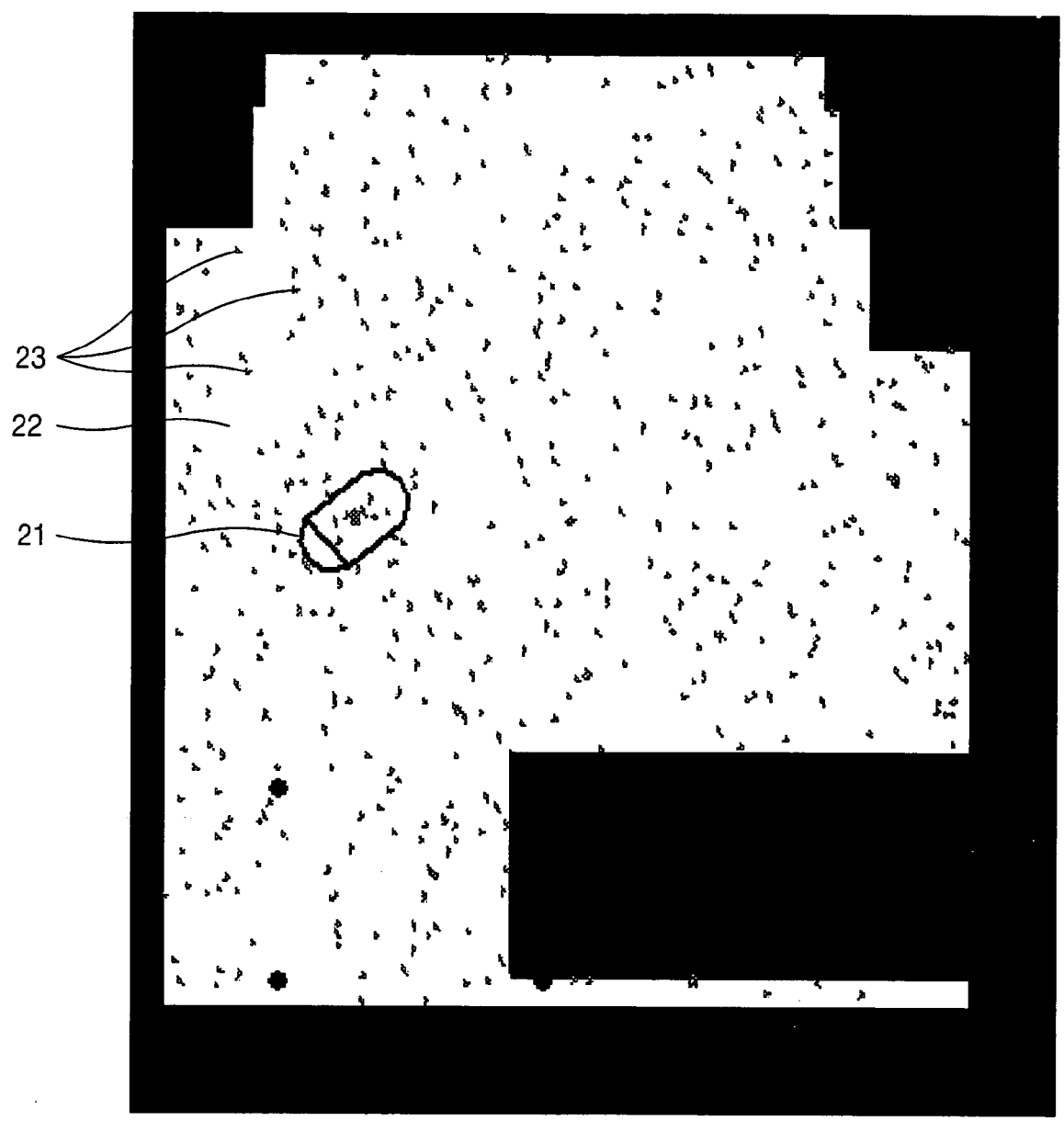
FIG. 2 illustrates randomly distributed samples in a space available to a robot.

FIG. 1 is a flowchart illustrating a global position estimation method, according to an embodiment of the present invention. Referring to FIG. 1, a sample set S is initialized and a number iNumber of samples is initialized to 0 (operation 10). The position and orientation of each sample can be represented with (x, y) and angle θ. It is assumed that the coordinates (x, y) are evenly distributed and the angle θ also evenly ranges from 0 to 360 degrees in an indoor available area. A sample's importance can be represented as 1/N, where the total number of samples is N. FIG. 2 illustrates samples randomly distributed in a space. In FIG. 2, reference numerals 21 through 23 denote an object, e.g., a robot, a plane where the object can move, and samples, respectively.

After operation 10, temperatures of the samples are obtained (operation 11 of FIG. 1). The temperature of a sample may be computed using an average local density of the samples. The temperature of a sample is high when the samples are evenly distributed, with the samples gradually being led from a low-density area to a high-density area.

To compute an average local density $D_t$ of a sample s that is randomly selected from the sample set, its local density $D_s$ is first computed as follows:

$$D_s = \lim_{V_0 \to 0} \frac{N_{V_0}}{V_0} \quad (1)$$

wherein N denotes the number of samples in the sample set and $V_0$ denotes a closed area surrounding the sample s.

Based on Equation (1), the average local density $D_t$ of the samples is computed as follows:

$$D_t = \frac{1}{N} \sum_i D_{ti} \quad (2)$$

wherein $D_{ti}$ denotes a local density of an $i^{th}$ sample at time t, and N denotes the number of the samples.

Figure 3:
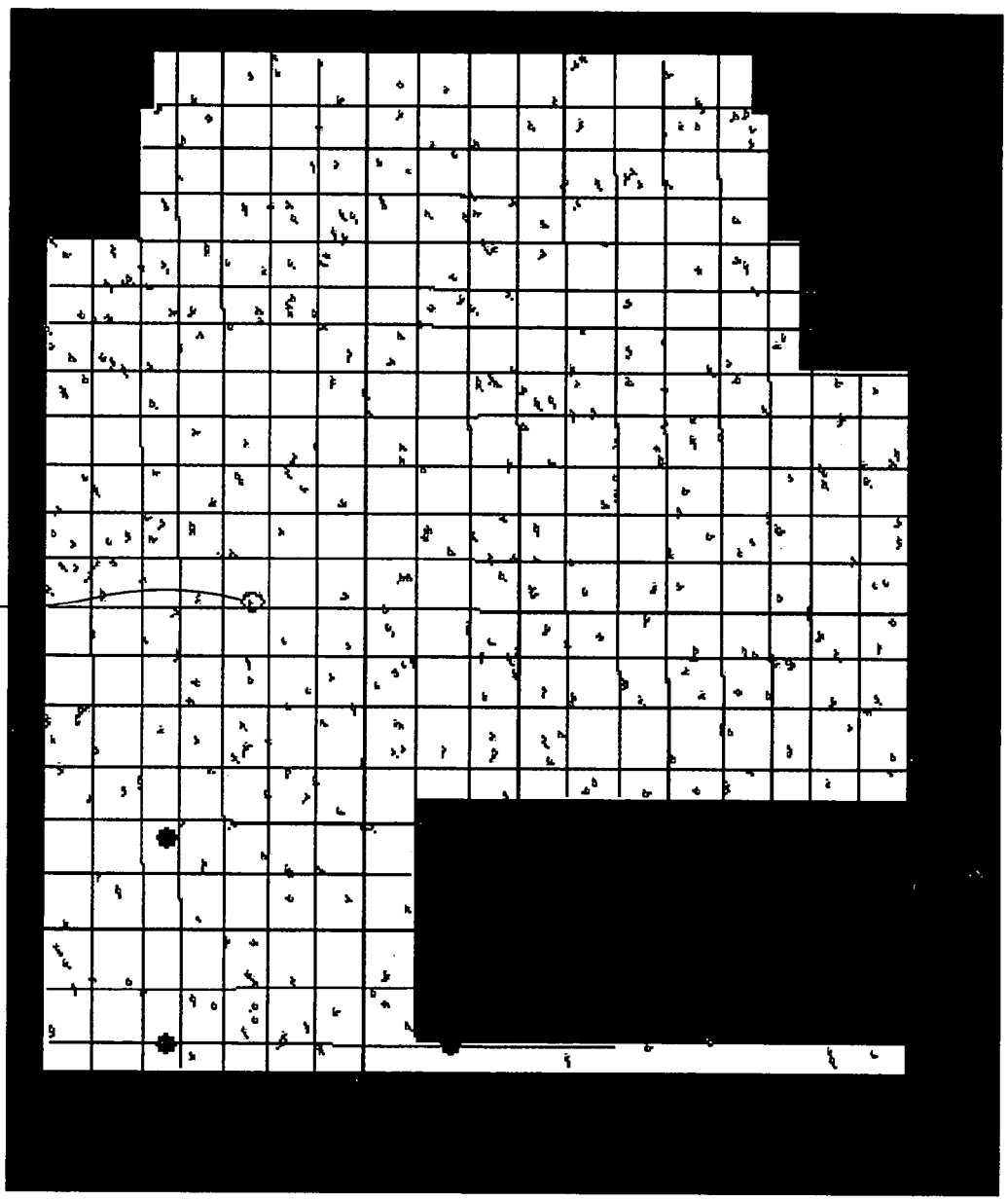
FIG. 3 illustrates a space available to a robot, with the space being divided into a grid.

A local density of a sample computed using Equation (1) may be computed using a plane divided in a grid form, shown in FIG. 3. In FIG. 3, reference numeral 30 denotes a real position of a robot in the space. When the size of each grid element is dxdy, the local density $D_s$ of a sample may be computed by dividing the number of samples included in a grid element to which the sample belongs by the area of the grid element.

In the case of the temperature of a sample, samples are initially evenly distributed, and thus, their temperatures are the same. However, since the samples become more and more clustered as time goes by, the highest temperature $T_t$ of a sample at the time t is calculated as $T_0 D_t/D_0$, wherein $T_0$ denotes an initial temperature. Assuming a $k^{th}$ sample has the least importance at time t, temperature $T_{ti}$ of an $i^{th}$ sample can be computed by the following equation (where i=1, 2, ..., N):

$$T_{ti} = T_t \cdot I(S_k)/I(S_i) \quad (3),$$

wherein $I(s_k)$ and $I(s_i)$ denote the importances of samples $S_k$ and $S_i$, respectively.

After operation 11, a random sample is selected from the sample set (operation 12 of FIG. 1). The sample selection is influenced by the importance thereof. That is, the higher a sample's importance, the higher the probability the sample will be selected. Restrictively, samples near the wall of a room in which a robot moves may not be selected. Computation of an importance I(s) of a sample will be later described in relation to operation 14.

Next, while the robot is moving, a next position and orientation of the selected sample are calculated (operation 13 of FIG. 1).

Figure 4:
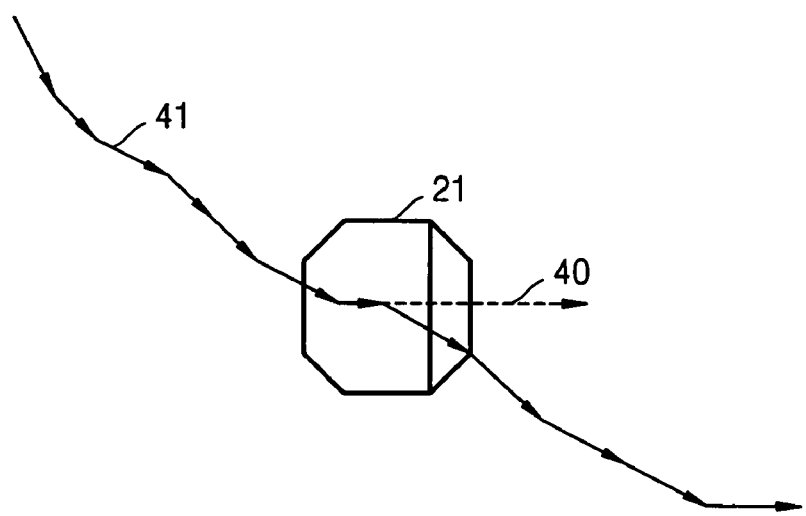
FIG. 4 illustrates positions and orientations of a moving robot.

FIG. 4 is a diagram of an orientation and tracking 41 along which a robot 21 travels. As illustrated, reference numeral 40 indicates the orientation of the head of the robot 21. The amount of movement of the robot 21 is determined by reading values recorded in an encoder installed in the robot 21. The amount of movement is based on a movement length Δl and a change in rotation direction Δθ of the robot 21, from time t to time (t+1). The change in rotation direction Δθ indicates a rotation angle of the head of the robot 21 from time t to time (t+1). The next position (x(t+1), y(t+1)) and orientation θ(t+1) of the sample can be computed using the determined Δl and Δθ as follows:

$$x(t+1) = x(t) + \Delta l \cos \theta(t)$$

$$y(t+1) = x(t) + \Delta l \sin \theta(t)$$

$$\theta(t+1) = \theta(t) + \Delta \theta \quad (4)$$

A sample s(t+1) shifted according to the position and orientation of the sample computed using Equation (4), is obtained. Then, a new sample s*(t+1) is generated in a square of the grid to which the sample s(t+1) belongs.

Next, the importances of the samples s(t+1) and s*(t+1) are computed (operation 14 of FIG. 1). The importance of a sample is computed using the confidence of the sample obtained using a sonar device(s) installed in the robot. When an incident angle is larger than a half of the sonar beam angle, multi-reflection will occur and a wrong value may be returned. In particular, since an incident angle of a beam output from the sonar is likely to be large in an indoor environment, the return value is probably quite erroneous. Accordingly, the sample importance can be obtained from the confidence of the sonar, which is calculated with respect to the incident angle of the beam.

Figure 5A:
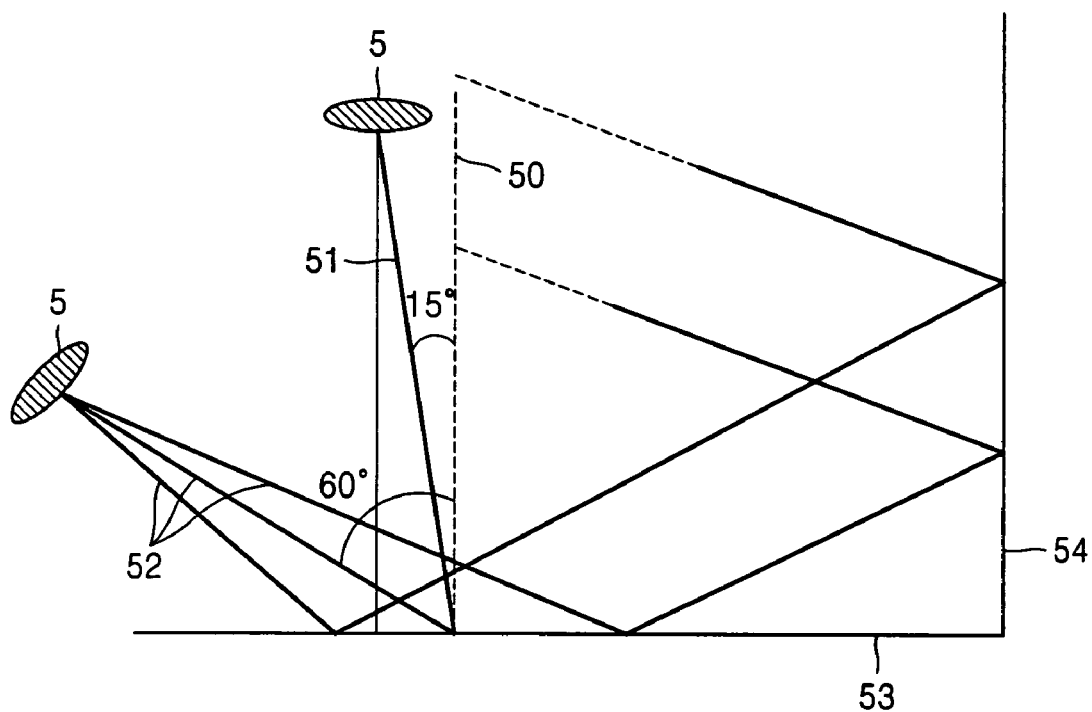
FIGS. 5A and 5B illustrate various types of reflections of an incident angle of a beam output from a sonar, measured indoors.
Figure 5B:
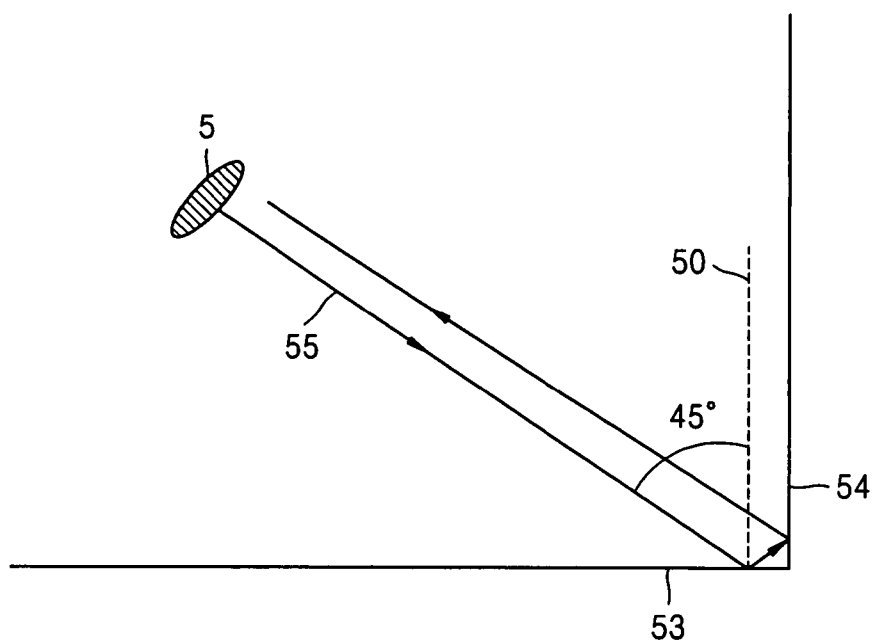

FIGS. 5A and 5B illustrate various reflections with respect to various incident angles of a beam output from the sonar 5, measured indoors. Referring to FIG. 5A, the incident angle indicates an angle formed by a beam 51, output from the sonar 5 to a first wall 53, and a vertical line 50. It is assumed that the beam angle of the sonar 5 is 30 degrees. The larger the incident angle, when the preferred incident angle is 15 degrees or less, e.g., half the beam angle, the less precise a returned value, e.g., the distance of the first wall 53 from the robot. When the incident degree is larger than 15 degrees, as with beams 52, where the beams 52 are sequentially reflected off the first wall 53 and then second wall 54, an incorrect distance value is returned to the sonar 5.

FIG. 5B illustrates a beam returned when an incident angle is larger than 15 degrees. Referring to FIG. 5B in this case, a beam 55 output from the sonar 5 is sequentially reflected off the first wall 53 and then the second wall 54, thereby causing a return value to be possibly returned to the sonar 5. Here, though the returned value may be mostly correct the returned value will be considered less precise since the incident angle is larger than 15 degrees.

Figure 6:
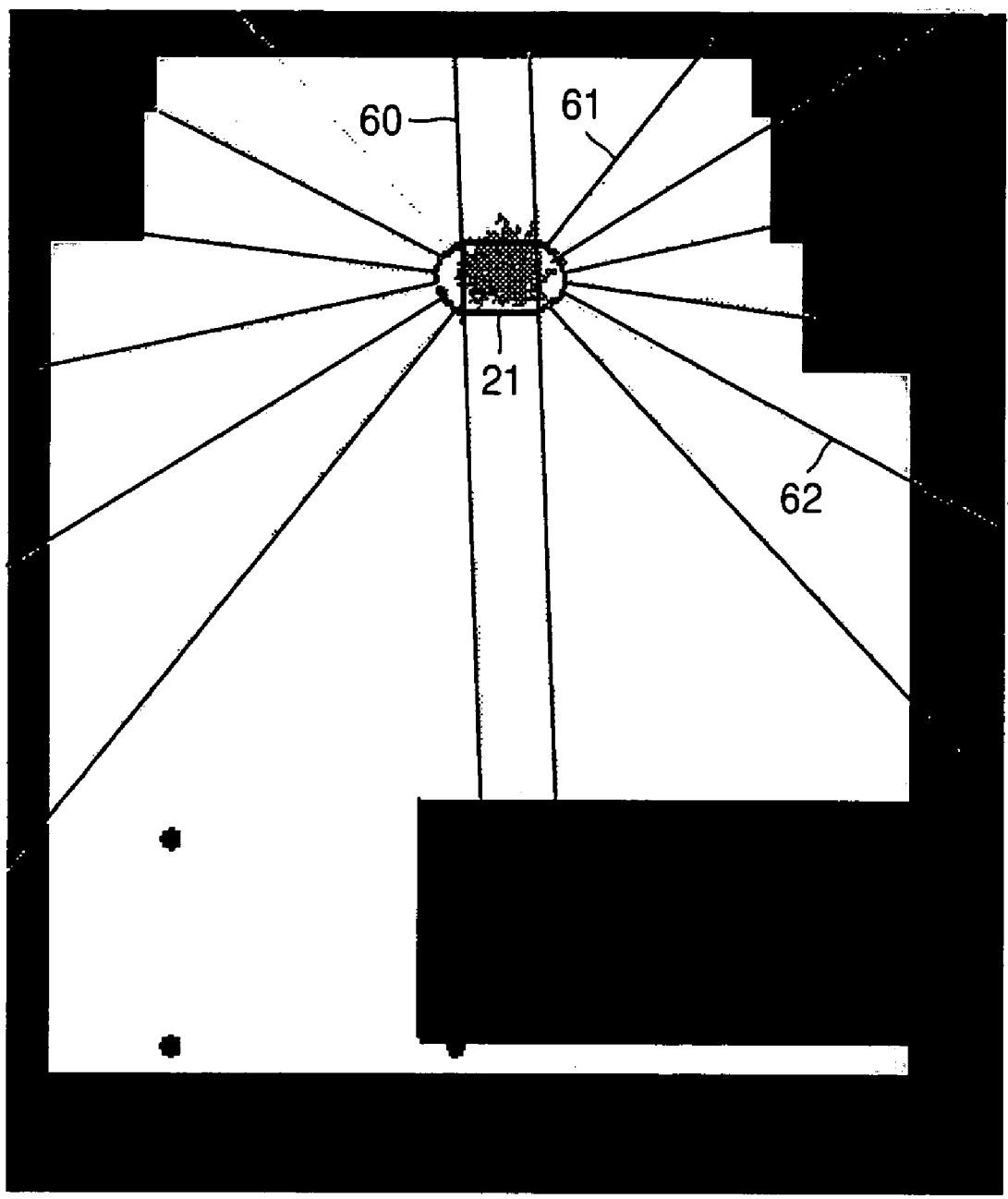
FIG. 6 illustrates return values of sequenced sonar operations, according to an embodiment of the present invention.

FIG. 6 illustrates the operations of sonars (not shown) installed in a robot 21, according to an embodiment of the present invention. It is assumed that the number of sonars is N. Referring to FIG. 6, the incident angle of a beam 60 output from the sonar is smaller than 15 degrees, thereby causing a correct return value to be considered more precise. As above, even though the incident angle of a beam 61 is greater than 15 degrees, a correct return value can be returned to the sonar due to the structures of walls and distance to the walls. However, the beam 61 causes multi-reflection, resulting an erroneous return value determination.

Accordingly, for a sample s when the incident angle $\beta_i$ of a beam output from an $i^{th}$ sonar is smaller than a half angle $\phi_0$ of the beam angle of the $i^{th}$ sonar, the confidence conf(i) of the sample s can be calculated by Equation (5). The reason why the confidence can be expressed according to Equation (5) below is illustrated in FIG. 5C.

Figure 5C:
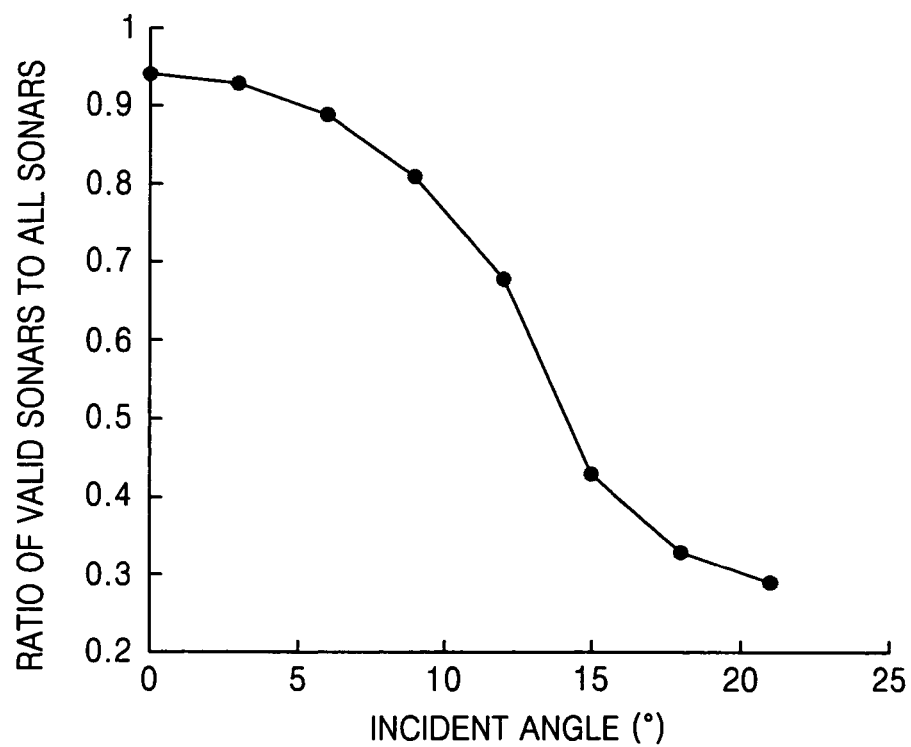
FIG. 5C is a graph illustrating the relationship between an importance of a sample and an incident angle of a beam output from a sonar, measured indoors.

FIG. 5C is a graph illustrating the relationship between a ratio of valid sonars to all sonars and an incident angle of a beam. In this experiment, about 500 samples were collected. In this embodiment of the present invention, the ratio of valid sonars to all the sonars is regarded as the confidence of the sample and satisfies a normal distribution expressed by the following equation:

$$\text{conf}(i) = \frac{1}{\sqrt{2\pi}\,\phi_0} e^{-\beta_i^2/2\pi\phi_0^2} \tag{5}$$

If the degree of the incident angle $\beta_i$ is equal to or larger than $\phi_0$, conf(i)=1 when the following equation is satisfied, and conf(i)=0 otherwise:

$$\text{fabs}[L_v(i) - L_e(i)] < [\sigma L_e(i)] \tag{6}$$

wherein, $L_v(i)$ denotes a virtual return value returned to an $i^{th}$ virtual sonar when it is assumed that the $i^{th}$ virtual sonar is located at a position of the sample s, $L_e(i)$ denotes a real return value returned to the $i^{th}$ sonar, σ denotes a dispersion value of the return values, and fabs□ denotes the absolute value of a floating decimal.

Based on the confidence conf(i) computed using Equations (5) and (6), the importance I(s) of the sample s is calculated as follows:

$$I(s) = \prod_{i=1}^{N} \text{conf}(i) \times \text{simp}(i), \tag{7}$$

wherein simp(i) denotes the importance of the sample s calculated according to the characteristics of the $i^{th}$ sonar, and is calculated using the following equation:

$$\text{simp}(i) = \frac{1}{\sqrt{2\pi}\,\phi_0} e^{-(L_v(i)-L_e(i))^2/2\phi_0^2} \tag{8}$$

After computation of the importance degree I(s) of the sample s, the importance I(s(t+1)) of a sample s(t+1) is compared with the importance I(s*(t+1)) of a sample s*(t+1). When the importance I(s*(t+1)) is larger than the importance I(s(t+1), the sample s(t+1) is replaced with the sample s*(t+1).

When the importance I(s*(t+1)) is smaller than or equal to the importance I(s(t+1)), a HK of the sample s(t+1) is computed as follows:

$$HK = e^{-(I(s)-I(s^*))/T} \tag{9}$$

wherein T denotes the temperature of a sample at time t, computed using Equation (3).

Next, a random value a evenly distributed between 0 and 1 is obtained. When the random value a is smaller than the HK of sample s(t+1), the sample s(t+1) is replaced with the sample s*(t+1). When the random value a is equal to or larger than the HK, the sample s(t+1) is maintained (operation 15 of FIG. 1). This process is referred to as simulated annealing.

As described above, it is possible to appropriately perturb samples according to their HK and congregate the samples at a correct position more quickly than when a conventional sampling method based on a sample importance is adopted.

Next, after perturbation of the samples at the next time (t+1), the sample set is updated and the number iNumber of the samples is increased by 1 (operation 16 of FIG. 1).

Next, the maximum sample number iMax of the perturbed samples is determined using a well-known Kullback-Leibler Distance (KLD) method (operation 17 of FIG. 1). The KLD method is a type of sampling in which sampling is performed less in a densely sampled region than in a sparsely sampled region. According to this sampling scheme of the KLD method, it is determined whether the sample distribution by the KLD is effective. The maximum sample number iMax denotes the number of samples, of the distance between a sample-based maximum likelihood estimate and an actually calculated belief distribution, does not exceed a threshold value.

Operations 12 through 18 of FIG. 1 are repeated when it is determined in operation 18 that the number iNumber of samples obtained in operation 16 is smaller than the maximum sample number iMa, and the samples are normalized otherwise (operation 19 of FIG. 1). The samples may be normalized using the importances of the samples. For instance, the $i^{th}$ sample is normalized by:

$$I_i \Big/ \sum_k I_k, \qquad (10)$$

wherein $I_i$ denotes the importance of the $i^{th}$ sample.

After the normalization of the samples, the position (x, y) of the robot is estimated from the normalized samples (operation 20 of FIG. 1). The estimated position (x, y) of the robot can be computed by the following equations:

$$x = \sum_i I_i \cdot x_i \qquad (11)$$

$$y = \sum_i I_i \cdot x_y,$$

wherein $x_i$ and $y_i$ denote an x-axial position and a y-axial position of the $i^{th}$ sample, respectively.

Figure 7A:
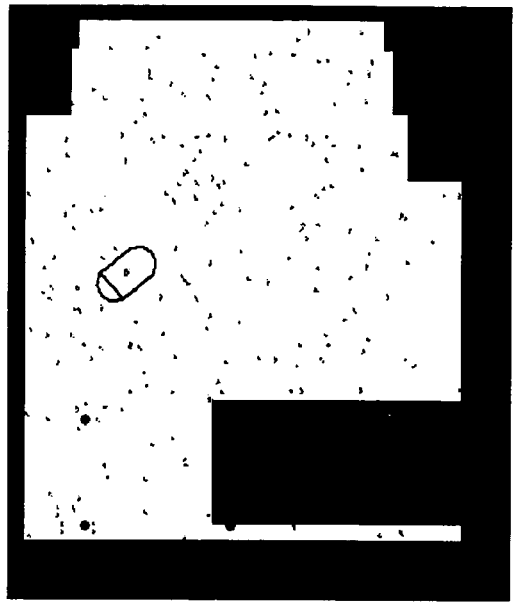
FIGS. 7A-7D illustrate results of a simulation of a global position estimation of a robot, according to an embodiment of the present invention.
Figure 7B:
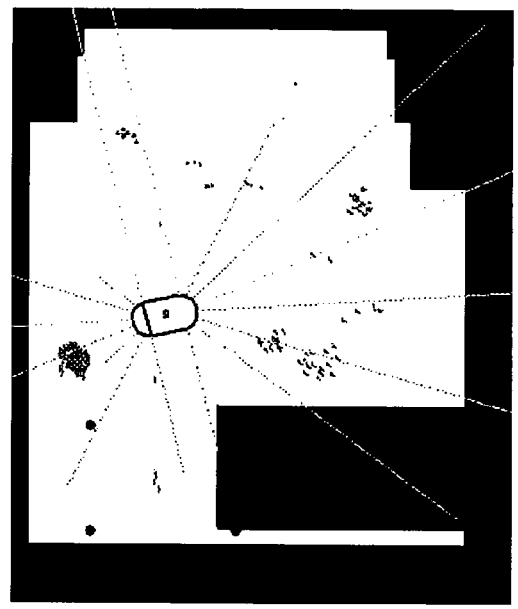
Figure 7C:
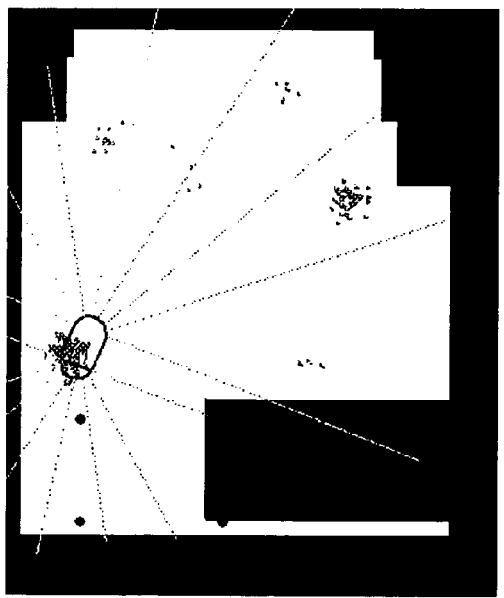
Figure 7D:
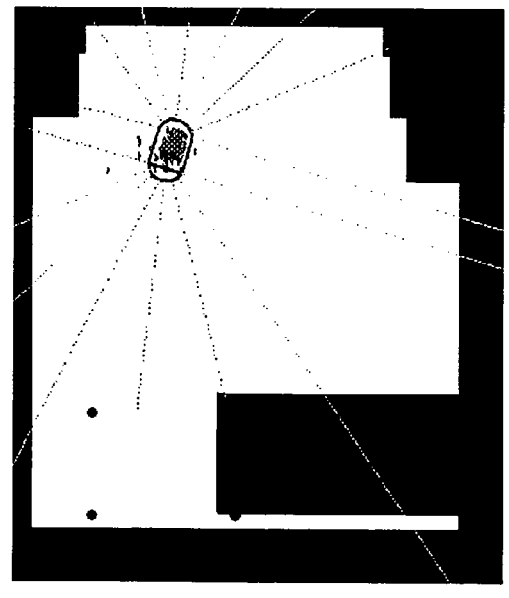

FIGS. 7A-7D illustrate results of an experiment of global localization of a robot, according to an embodiment of the present invention. In the experiment, 200 samples were used in an initial process, with FIG. 7A illustrating even distribution of the initial samples. In FIGS. 7A through 7D, ellipses reference the robot or robot position and each semi-circle references the head of the robot. FIGS. 7B through 7D illustrate each sample distribution, robot position, and return values returned to sonars when the robot moves by 5, 10, and 20 time steps, respectively. The robot proceeds in parallel movement and rotation.

Figure 8:
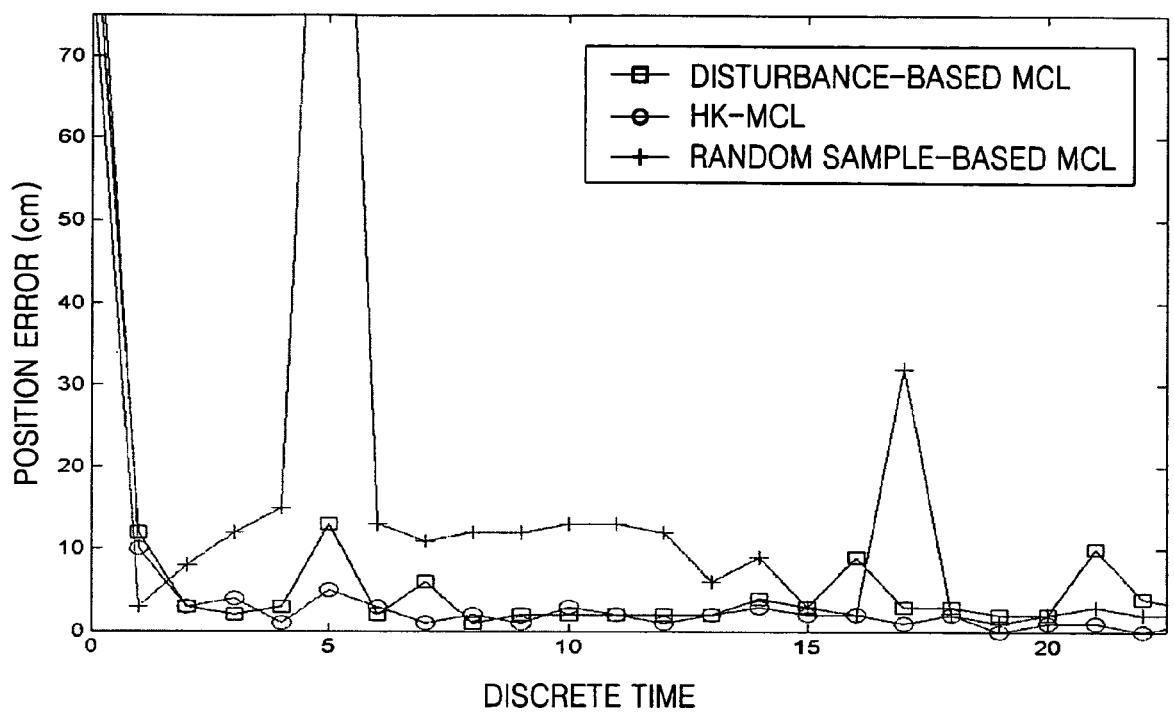
FIG. 8 is a graph illustrating position errors of a robot over discrete time, resulting from the position of a robot being estimated using conventional Monte-Carlo Localization (MCL) methods and a Heat Kernel (HK)-based MCL method, according to an embodiment of the present invention.

FIG. 8 is a graph illustrating position errors of a robot with respect to discrete time, obtained when the position of a robot is estimated using conventional MCL methods and an HK-based MCL method according to an embodiment of the present invention. The graph of FIG. 8 reveals that position errors obtained when using the HK-based MCL method are smaller than those obtained when using the conventional MCL methods. Conventional MCL methods include a random sample-based MCL method where samples are added randomly to the MCL method, and a disturbance-based MCL method which has drift errors of the sonar incorporated into the MCL method.

Figure 9:
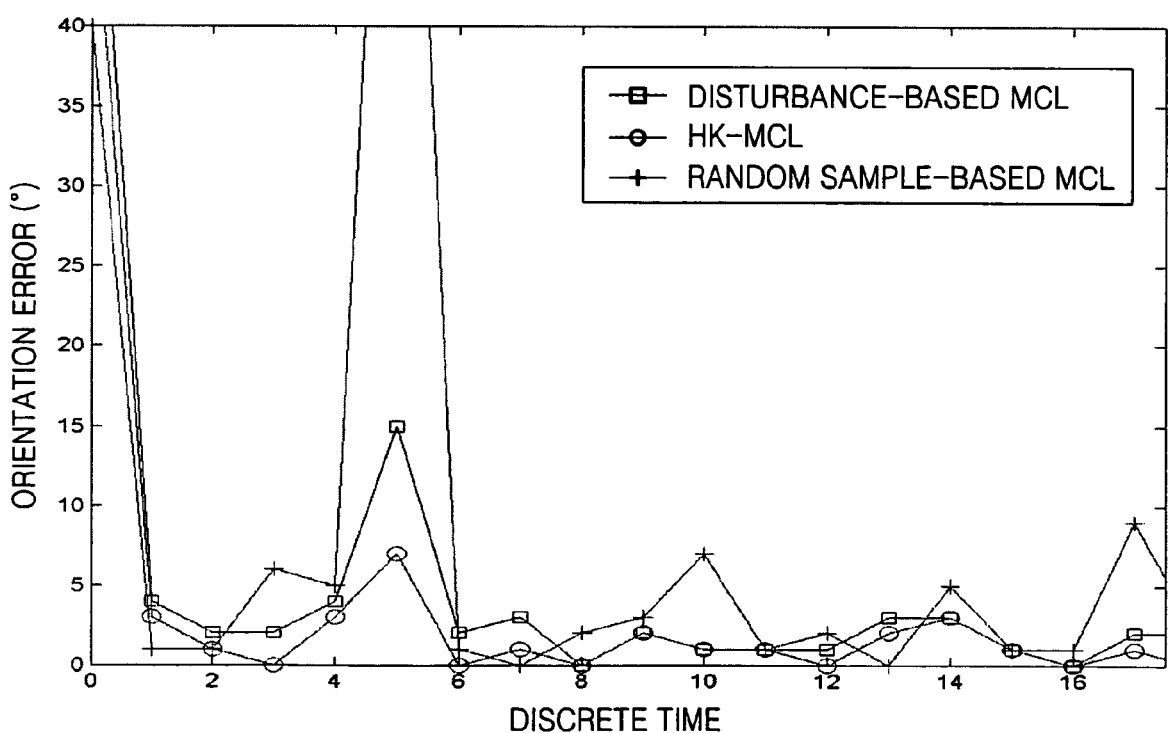
FIG. 9 is a graph illustrating orientation errors of a robot over discrete time, resulting from the position of a robot being estimated using conventional MCL methods and an HK-based MCL method, according to an embodiment of the present invention.

FIG. 9 is a graph illustrating orientation errors of a robot with respect to discrete time, obtained when the position of a robot is estimated using the conventional MCL methods and the HK-based MCL method according to an embodiment of the present invention. The graph of FIG. 9 shows that the orientation errors obtained when using the HK-based MCL method are smaller than those obtained when using the conventional MCL methods.

Figure 10:
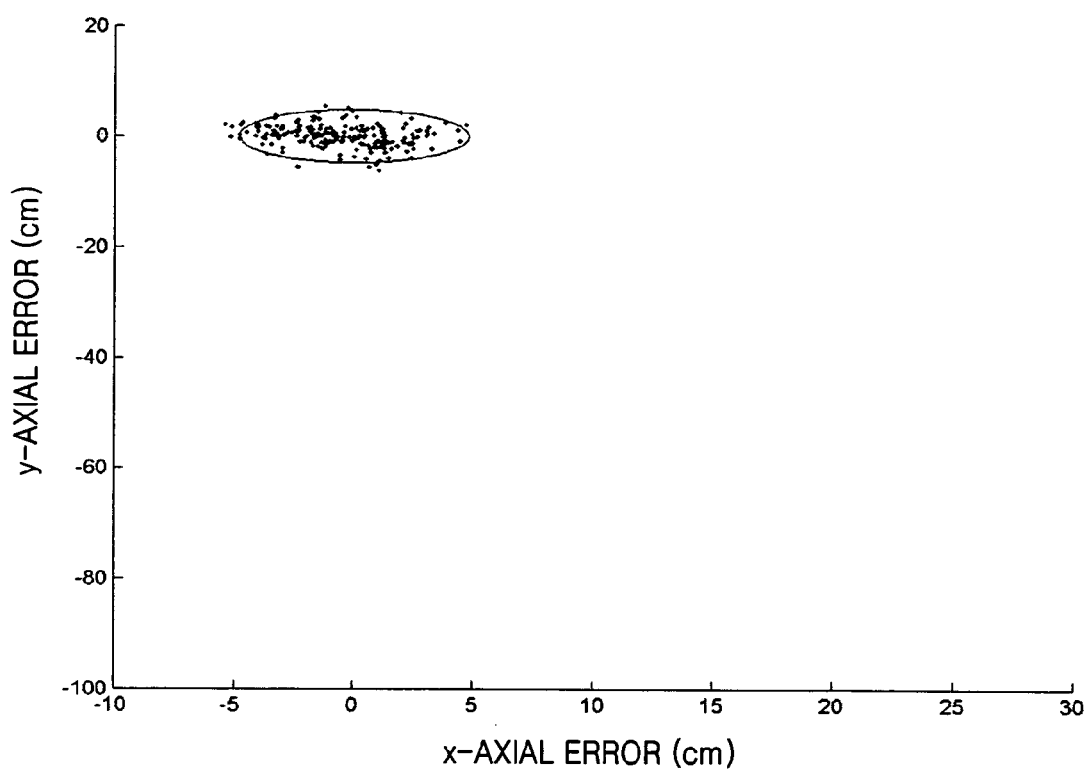
FIG. 10 is a graph illustrating position errors of a robot, reflected in an x-y axial form, generated when using a HK-based MCL method, according to an embodiment of the present invention.

FIG. 10 is a graph illustrating positioning errors of a robot, measured in the x-axis and y-axis directions, obtained when the position of a robot is estimated using the HK-based MCL method according to an embodiment of the present invention. Referring to FIG. 10, the range of the position error values, defined by an ellipse, is about 4.5 cm long.

Figure 11:
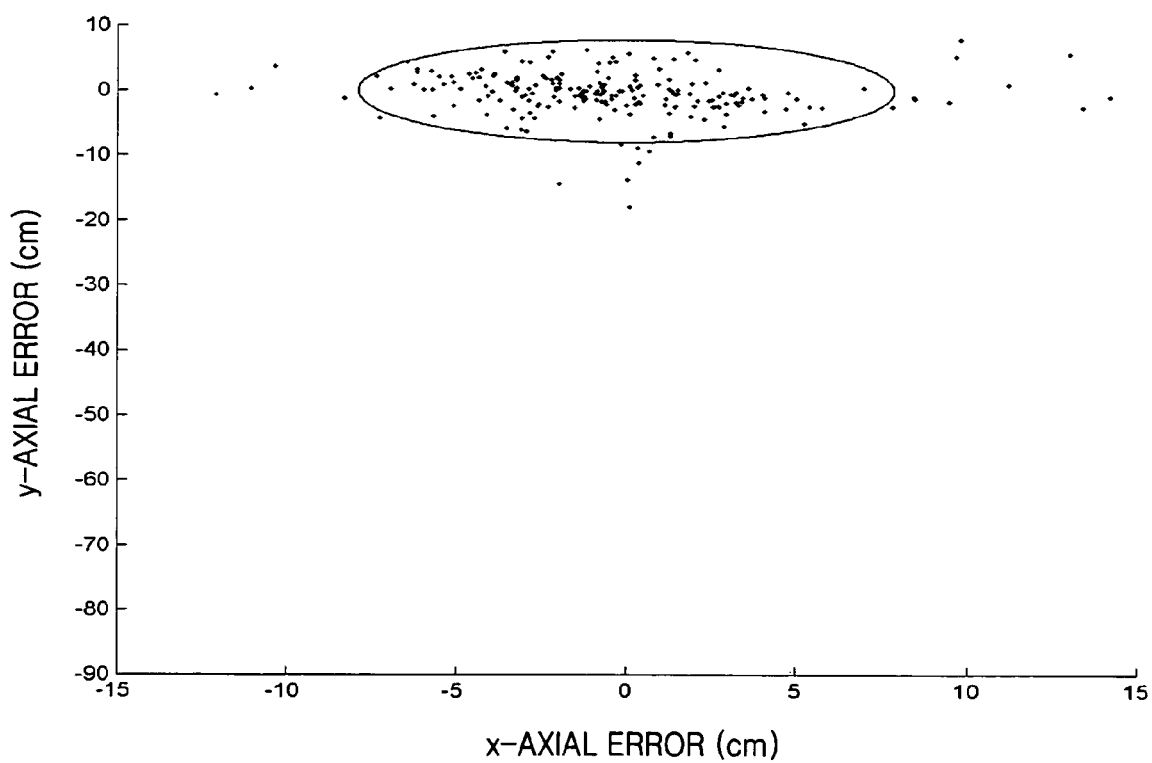
FIG. 11 is a graph illustrating position errors of a robot, reflected in an x-y axial form, generated when using a conventional disturbance-based MCL method.

FIG. 11 is a graph illustrating positioning errors of a robot, measured in the x-axis and y-axis directions, obtained when the position of a robot is estimated using the conventional disturbance-based MCL method. Referring to FIG. 11, the range of the position errors, defined by an ellipse, is about 8 cm long.

Figure 12:
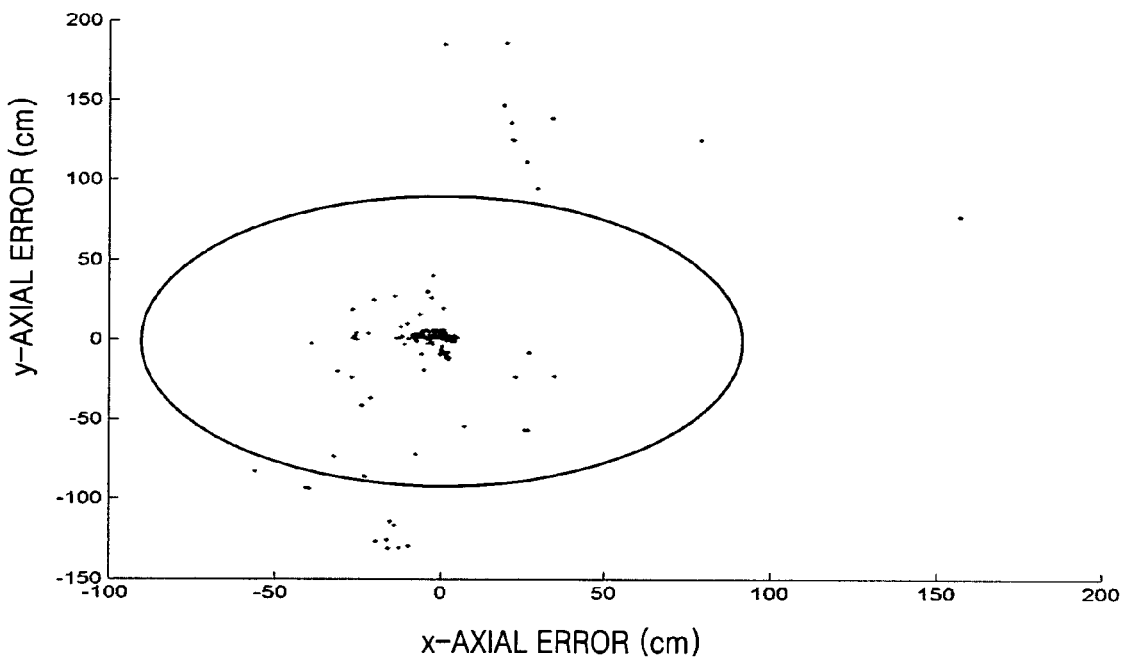
FIG. 12 is a graph illustrating y-axial position errors of a robot over an x-axis, according to a conventional random sample-based MCL method.

FIG. 12 is also a graph illustrating positioning errors of a robot, measured in the x-axis and y-axis directions, obtained when the position of a robot is estimated using the conventional random sample-based MCL method. Referring to FIG. 12, the range of the position errors, defined by an ellipse, is about 20 cm long.

As apparent from FIGS. 10 through 12, the range of positioning errors measured using the HK-based MCL method is smaller than those of positioning errors measured using the conventional MCL methods.

Figure 13:
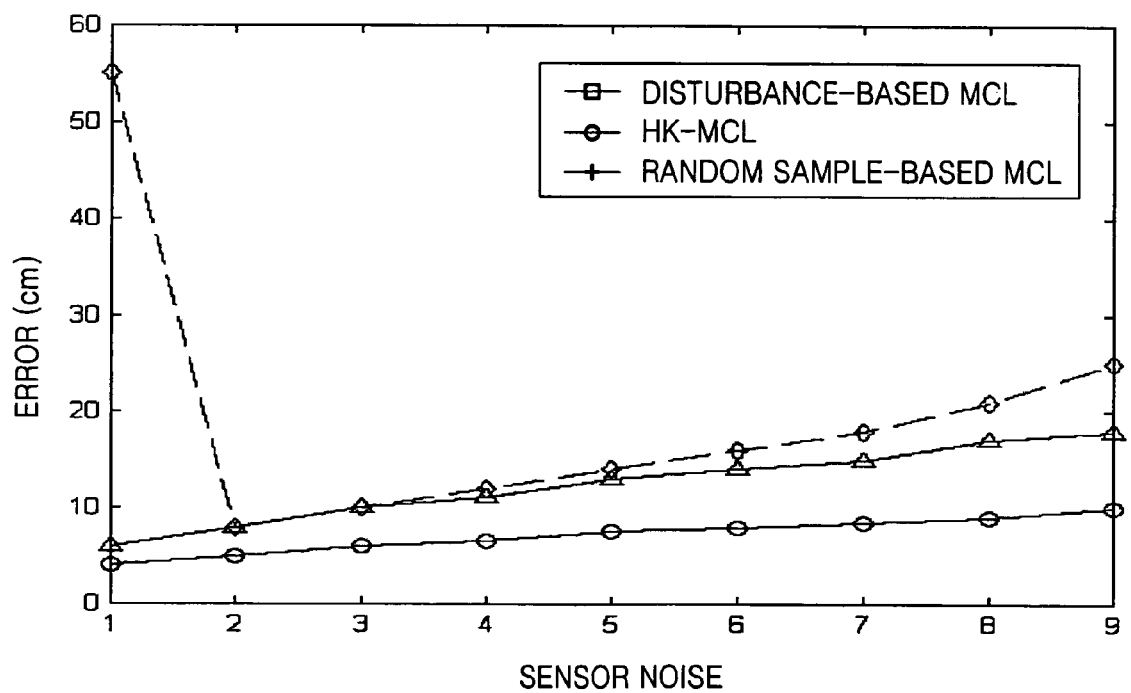
FIG. 13 is a graph illustrating position errors, with respect to sensor noise, with the position of a robot being estimated using conventional MCL methods and an HK-based MCL method, according to an embodiment of the present invention.

FIG. 13 is a graph illustrating positioning errors with respect to sensor noise when the position of a robot is estimated, using the conventional MCL methods and the HK-based MCL method according an embodiment of the present invention. The graph of FIG. 13 shows that the HK-based MCL method is the most robust against sensor noise.

Initially, a robot global localization method, according to an embodiment of the present invention, does not need a large number of samples. Also, the temperatures of the samples are gradually reduced using a simulated annealing process, thereby enabling control of perturbation of the samples. Accordingly, it is possible to localize a robot faster, with a smaller error range, than conventional MCL methods. The present invention can also solve a difficulty, where the temperature in the simulated annealing process is not quantitatively defined, by using a relationship among the temperature, the average local density, and the sample importance. Also, the importance of a sample is determined based on the confidence of a sample, using a sensor installed in the robot, thereby performing sampling more stably.

Embodiments of the present invention can be implemented through computer readable code/instructions, e.g., programs, in digital computer(s), e.g., a controller. The computer readable code can be in a medium, e.g., a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet), for example only.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A global localization method, comprising:
   selecting one of a plurality of samples and shifting the selected sample according to a movement of an object;
   generating a new sample within a predetermined range of the shifted sample;
   determining either the shifted sample or the new sample as a next sample at a next time step according to a predetermined condition for the shifted sample and the next sample;
   repeating the selecting and shifting of the one sample, generating of the new sample, and determining of either the shifted sample or the new sample as the next sample, for all of the plurality of samples; and
   estimating a next position of the object according to positions of next samples when a number of the next samples is equal to or larger than a maximum number of samples.

2. The method of claim 1, wherein the new sample is generated within an element of a grid to which the shifted sample belongs, the grid covering a plane where the object can move.

3. The method of claim 1, wherein the selecting of the one from the plurality of samples is performed according to an importance of each of the plurality of samples reflecting a confidence of a sensor installed in the object.

4. The method of claim 3, wherein the confidence of the sensor is determined by a beam output from the sensor and a return value, with the return value being obtained from a beam reflected into the sensor.

5. The method of claim 4, wherein when the sensor is a sonar sensor and the confidence of the sonar sensor is disproportional to an incident angle of the beam reflected into the sonar sensor.

6. The method of claim 5, wherein when the incident angle of a beam output from an $i^{th}$ sonar sensor is smaller than half of a beam angle of the beam output from the sonar sensor, the confidence of the sonar sensor is computed by:

$$\text{conf}(i) = \frac{1}{\sqrt{2\pi}\ \phi_0} e^{-\beta_i^2/2\pi\phi_0^2},$$

wherein conf(i) denotes the confidence of the sonar sensor, $\beta_i$ denotes the incident angle of the beam, and $\phi_0$ denotes half the beam angle of the beam output from the sonar sensor.

7. The method of claim 6, wherein if the incident angle is equal to or larger than half the beam angle of the beam, the confidence of the sonar sensor is determined to be 1 when the following relationship is satisfied and is determined to be 0 otherwise:

$$\text{fabs}[L_v(i)-L_e(i)]<[\sigma L_e(i)] \tag{6}$$

wherein $L_v(i)$ denotes a return value returned to an $i^{th}$ virtual sonar sensor which is assumed to be at a position of the sample, $L_e(i)$ denotes a return value returned to an $i^{th}$ sonar sensor, $\sigma$ denotes a dispersion value of the return value, and fabs□ denotes an absolute value of a floating decimal.

8. The method of claim 3, wherein when it is assumed that an $i^{th}$ virtual sonar sensor is at a position of the sample, the importance of the sample is computed exponentially with respect to a difference between a return value returned to an $i^{th}$ sonar sensor and a return value returned to the $i^{th}$ virtual sonar sensor installed in the object.

9. The method of claim 3, wherein the determining of the next sample comprises:
obtaining a heat kernel of the selected sample when an importance of the shifted sample is smaller than or equal to an importance of the new sample; and
determining either the shifted sample or the new sample as the next sample based on the obtained heat kernel.

10. The method of claim 9, wherein the obtaining of the heat kernel comprises:
obtaining a temperature of the selected sample; and
computing the heat kernel using a following equation and the temperature of the selected sample:

$$HK=e^{-(I(s)-I(s^*))/T}$$

wherein T denotes a temperature of a sample at a current time, I(s) denotes the importance of the shifted sample, and I(s*) denotes the importance of the new sample.

11. The method of claim 10, wherein the determining of the next sample comprises:
generating a random number which falls within a predetermined range; and
determining the new sample as the next sample when the random number is smaller than the heat kernel.

12. The method of claim 11, further comprising determining the shifted sample as the next sample when the random number is equal to or larger than the heat kernel.

13. The method of claim 10, further comprising obtaining of temperatures of samples, by:
setting initial temperatures of the samples;
computing local densities and average local density of the samples;
computing a maximum temperature of shifted samples using the initial temperatures and the average local density; and
computing the temperatures of the samples using the maximum temperature and their local densities.

14. The method of claim 13, wherein a local density of each of the samples is obtained by computing a ratio of a number of samples included in an element of a grid to which the sample belongs, the grid covering a plane where the object can move.

15. The method of claim 3, wherein during the determining of the next sample, the new sample is determined as the next sample when an importance of the shifted sample is larger than an importance of the new sample.

16. The method of claim 3, wherein the determination of the position of the object comprises:
normalizing an importance of the next sample; and
multiplying the normalized importance of the next sample by a position value.

17. The method of claim 1, wherein the maximum number of samples is determined using a Kullback-Leibler Distance method.

18. A medium comprising computer readable code implementing the method of claim 1.

19. An apparatus comprising a distance detection device and a controller controlling the implementation of the method of claim 1.

* * * * *